United States Patent
Tan et al.

(10) Patent No.: US 9,927,884 B2
(45) Date of Patent: Mar. 27, 2018

(54) NON TRANSITORY COMPUTER READABLE RECORDING MEDIUM FOR EXECUTING IMAGE PROCESSING METHOD, AND IMAGE SENSING DEVICE APPLYING THE IMAGE PROCESSING METHOD

(71) Applicant: PixArt Imaging (Penang) SDN. BHD., Penang (MY)

(72) Inventors: Zi Hao Tan, Penang (MY); Kevin Len-Li Lim, Penang (MY)

(73) Assignee: PixArt Imaging (Penang) SDN. BHD., Penang (MY)

(*) Notice: Subject to any disclaimer, the term of this patent is extended or adjusted under 35 U.S.C. 154(b) by 151 days.

(21) Appl. No.: 14/934,169

(22) Filed: Nov. 6, 2015

(65) Prior Publication Data
US 2017/0131799 A1    May 11, 2017

(51) Int. Cl.
G06F 3/0354    (2013.01)
G06F 3/038     (2013.01)

(52) U.S. Cl.
CPC .......... G06F 3/03543 (2013.01); G06F 3/038 (2013.01)

(58) Field of Classification Search
CPC .............................. G06F 3/03543; G06F 3/038
See application file for complete search history.

(56) References Cited

U.S. PATENT DOCUMENTS

| | | | | |
|---|---|---|---|---|
| 6,664,948 B2 * | 12/2003 | Crane | ............... | G06F 3/0317 345/163 |
| 7,085,418 B2 * | 8/2006 | Kaneko | ............... | G06T 7/20 382/209 |
| 2004/0130532 A1 * | 7/2004 | Gordon | ............... | G06F 1/3203 345/166 |
| 2004/0208348 A1 * | 10/2004 | Baharav | ............... | G06F 3/0421 382/124 |
| 2005/0083304 A1 * | 4/2005 | Wang | ............... | G06F 3/0317 345/166 |
| 2005/0110746 A1 * | 5/2005 | Hou | ............... | G06F 1/3203 345/156 |
| 2005/0134567 A1 * | 6/2005 | Raynor | ............... | G06F 3/0317 345/166 |
| 2005/0151724 A1 * | 7/2005 | Lin | ............... | G06F 3/0317 345/166 |
| 2005/0190158 A1 * | 9/2005 | Casebolt | ............... | G06F 3/0317 345/166 |
| 2005/0200600 A1 * | 9/2005 | Lee | ............... | G06F 3/0317 345/156 |
| 2006/0139458 A1 * | 6/2006 | Chou | ............... | G06F 3/0317 348/208.1 |

(Continued)

Primary Examiner — Jose Soto Lopez
(74) Attorney, Agent, or Firm — Winston Hsu (57) ABSTRACT

A non-transitory computer-readable medium storing a program causing a computer to execute an image processing method applied to an image sensing device. The image processing method comprises: (a) comparing a frame delta between a reference frame and a first frame with a predetermined threshold value to generate a first comparing result; (b) comparing a frame rate of the image sensing device with a minimum frame rate and/or a maximum frame rate, to generate a second comparing result; and (c) adjusting one of the frame rate and an offset for a correlation window of the image sensing device, according to the first comparing result and the second comparing result.

24 Claims, 6 Drawing Sheets

(56) References Cited

U.S. PATENT DOCUMENTS

| | | | |
|---|---|---|---|
| 2007/0002021 A1* | 1/2007 | Lin | G06F 3/0317 345/166 |
| 2007/0103439 A1* | 5/2007 | Gordon | G06F 3/0317 345/163 |
| 2007/0150194 A1* | 6/2007 | Chirikov | G06F 3/0317 701/500 |
| 2007/0252814 A1* | 11/2007 | Lin | G06F 3/0317 345/158 |
| 2008/0007519 A1* | 1/2008 | Mellot | G06F 3/03543 345/156 |
| 2009/0195505 A1* | 8/2009 | Chen | G06F 1/3203 345/166 |
| 2009/0208133 A1* | 8/2009 | Chang | G06F 3/0317 382/278 |
| 2010/0103323 A1* | 4/2010 | Wredenhagen | H04N 5/145 348/699 |
| 2010/0172545 A1* | 7/2010 | Lim | G01S 17/023 382/106 |
| 2011/0038508 A1* | 2/2011 | Teoh | G06F 1/3203 382/103 |
| 2011/0150363 A1* | 6/2011 | Chen | G06F 3/0383 382/291 |
| 2011/0288805 A1* | 11/2011 | Dejnabadi | G01P 7/00 702/96 |
| 2012/0047193 A1* | 2/2012 | Lin | G06F 3/03543 708/445 |
| 2013/0229514 A1* | 9/2013 | Huang | G01C 11/02 348/140 |
| 2013/0249800 A1* | 9/2013 | Chung | G06F 1/3259 345/166 |
| 2013/0301880 A1* | 11/2013 | Chen | G06T 7/0044 382/103 |
| 2014/0022168 A1* | 1/2014 | Kao | G06F 3/0325 345/157 |
| 2014/0161320 A1* | 6/2014 | Kakarala | G06F 3/0304 382/103 |
| 2014/0306892 A1* | 10/2014 | Lin | G09G 5/22 345/159 |

* cited by examiner

NON TRANSITORY COMPUTER READABLE RECORDING MEDIUM FOR EXECUTING IMAGE PROCESSING METHOD, AND IMAGE SENSING DEVICE APPLYING THE IMAGE PROCESSING METHOD

BACKGROUND OF THE INVENTION

1. Field of the Invention

The present invention relates to an image processing method and an image sensing device, and particularly relates to an image processing method and an image sensing device which can maintain a constant offset for the correlation window.

2. Description of the Prior Art

Conventionally, an image sensor in an optical mouse always utilizes a correlation window (ex. a 3×3 or 5×5 correlation window) to detect the displacement of the optical mouse. Also, the image sensor with a constant frame rate or "pre-programmed" variable frame rates will use "prediction" to estimate a next "offset" location for the correlation window. The offset indicates a difference between starting coordinates for correlation windows at different timings. For example, each correlation window is supposed to have a starting coordinate of (0.0). However, the correlation window may start at a different coordinate such as (1,1) due to the movement of the optical mouse.

The above-mentioned "prediction" may be non-efficient to predict the offset if the optical mouse is operating at some specific situations, for example, at a low speed but a high frame rate.

SUMMARY OF THE INVENTION

Therefore, one objective of the present invention is to provide an image sensing method which can maintain the offset for a correlation window at a constant value.

Another objective of the present invention is to provide an image sensing device which can maintain the offset for a correlation window at a constant value.

One embodiment of the present invention discloses a non-transitory computer-readable medium storing a program causing a computer to execute an image processing method applied to an image sensing device. The image processing method comprises: (a) comparing a frame delta between a reference frame and a first frame with a predetermined threshold value to generate a first comparing result; (b) comparing a frame rate of the image sensing device with a minimum frame rate and/or a maximum frame rate, to generate a second comparing result; and (c) adjusting one of the frame rate and an offset for a correlation window of the image sensing device, according to the first comparing result and the second comparing result.

Another embodiment of the present invention discloses an image sensing device, which comprises an image sensor, a comparing unit and a control unit. The image sensor is configured to capture a first frame and a reference frame. The comparing unit is configured to compare a frame delta between the reference frame and the first frame with a predetermined threshold value to generate a first comparing result, and configured to compare a frame rate of the image sensing device with a minimum frame rate and/or a maximum frame rate, to generate a second comparing result. The control unit is configured to adjust one of the frame rate and an offset for a correlation window of the image sensor, according to the first comparing result and the second comparing result.

In view of above-mentioned embodiments, the offset for the correlation window can be maintained at a constant value, thus the prediction issue for the prior art can be solved.

These and other objectives of the present invention will no doubt become obvious to those of ordinary skill in the art after reading the following detailed description of the preferred embodiment that is illustrated in the various figures and drawings.

DETAILED DESCRIPTION

Following embodiments are provided for explaining the concept of the present invention. Please note these embodiments are only examples and do not mean to limit the scope of the present invention.

FIG. 1-FIG. 4 are schematic diagrams illustrating an image processing method according to different embodiments of the present application. In the embodiment depicted in FIG. 1, the frame delta FD is less than a predetermined threshold value VT. The frame delta FD, which is proportional to the offset for the correlation window, indicates the difference between a reference frame (the frame f1 in this embodiment) and a comparison frame (the frame f2 in this embodiment). The frame delta FD, for example, is displacement between the reference frame and the comparison frame in one embodiment, but not limited. If the frame delta FD is small, it may indicate the offset is small. Accordingly, if the offset is desired to maintain at a constant value, the offset must be adjusted.

Figure 1:
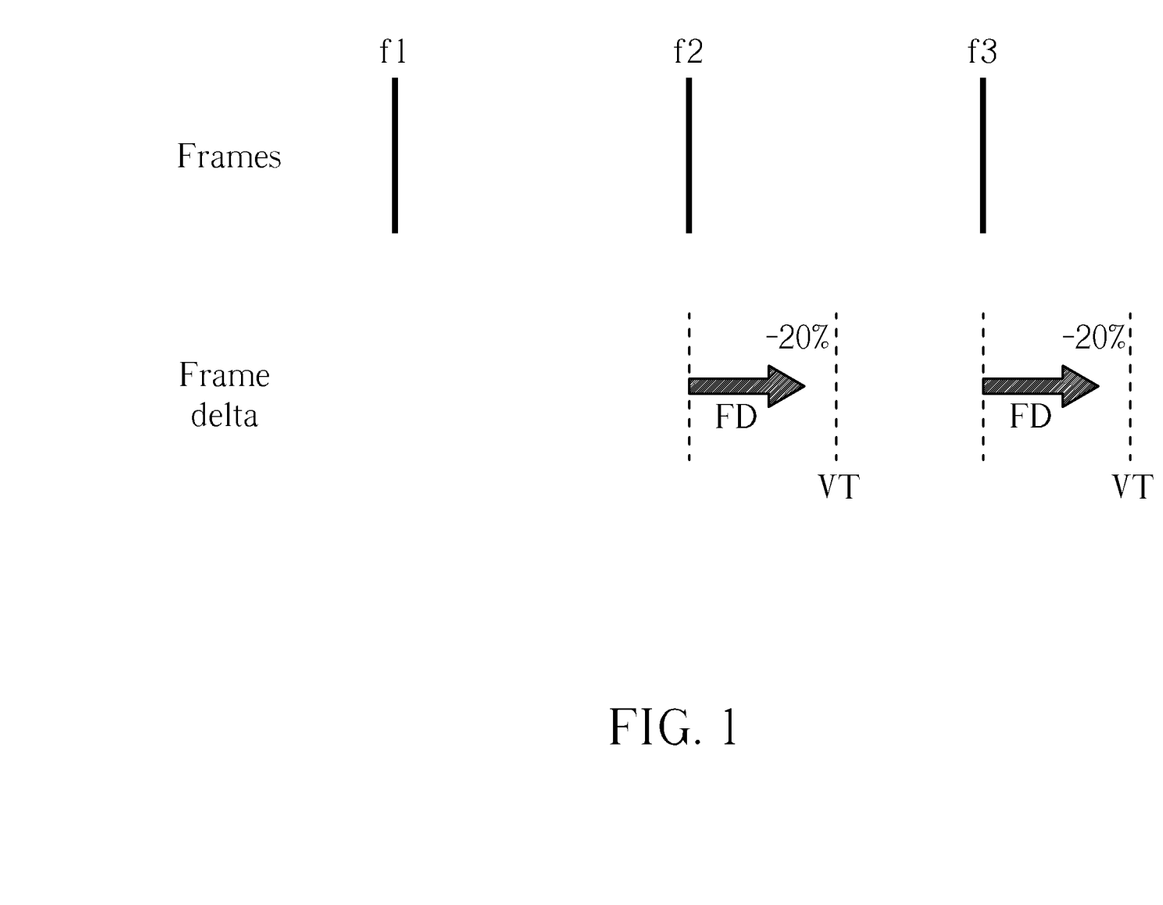
FIG. 1-FIG. 4 are schematic diagrams illustrating an image processing method according to different embodiments of the present application.
Figure 2:
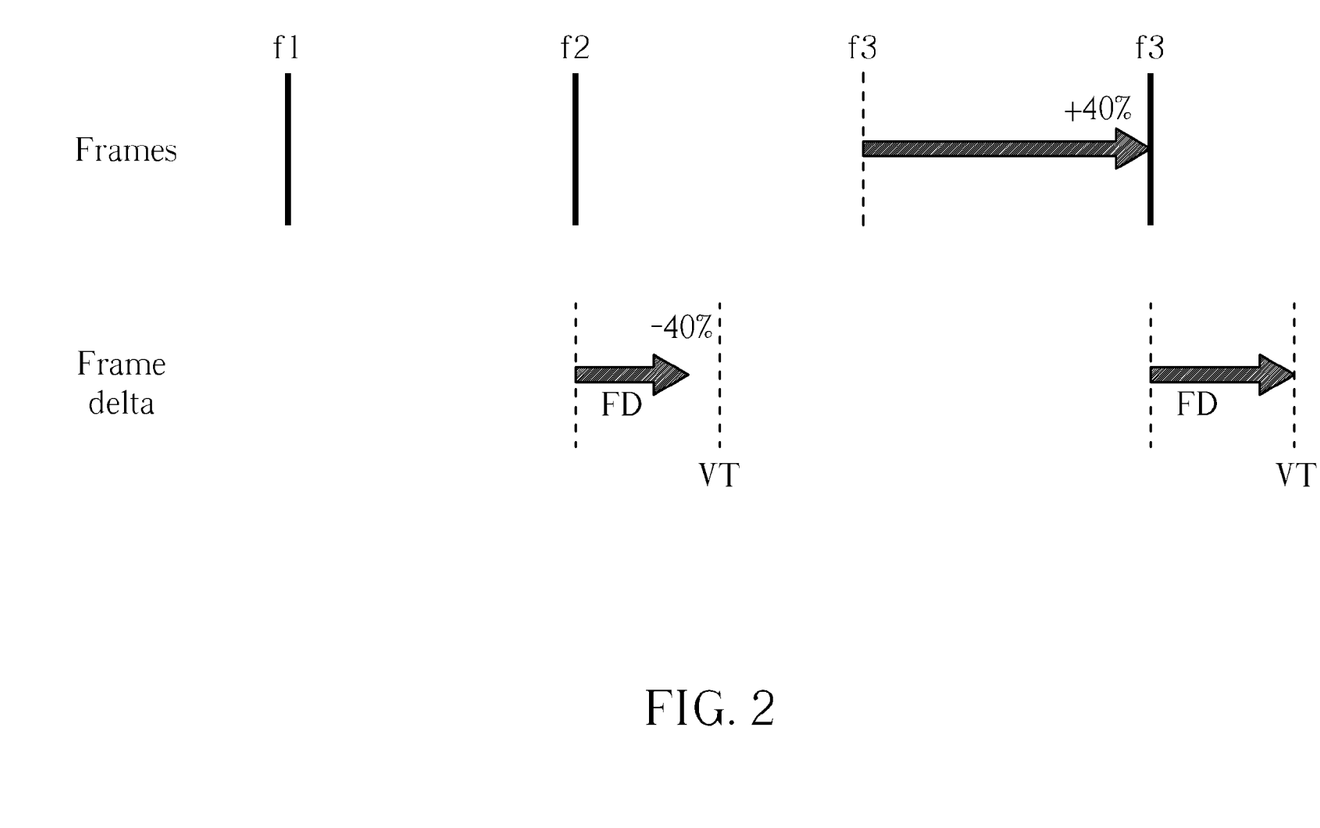

In the embodiment of FIG. 1, a difference between the frame rate and the minimum frame rate is smaller than or equals a predetermined difference (in this embodiment, the frame rate equals to the minimum frame rate). Accordingly, the frame rate in the embodiment in FIG. 1 is bounded by the minimum frame rate and cannot be adjusted. Therefore, the offset is directly reduced to maintain the offset at a constant value. On the contrary, in the embodiment depicted in FIG. 2, the frame delta FD is also less than a predetermined threshold value VT, but the frame rate is not bounded by the minimum frame rate. Therefore, the embodiment in FIG. 2 reduces the frame rate (i.e. increase the frame period between the frames f2 and f3). By this way, the frame delta FD is increased and the offset is correspondingly increased.

The above-mentioned predetermined threshold value VT can be any predetermined value. In one embodiment, the predetermined threshold value VT is a re-reference threshold value. That is, if the frame delta is equal to or larger than the predetermined threshold value, the reference frame is replaced with a comparison frame. For example, in the embodiment of FIG. 3, the frame delta FD is larger than the predetermined threshold value VT, thus the frame f2 which is a comparison frame, is set as a reference frame.

Figure 3:
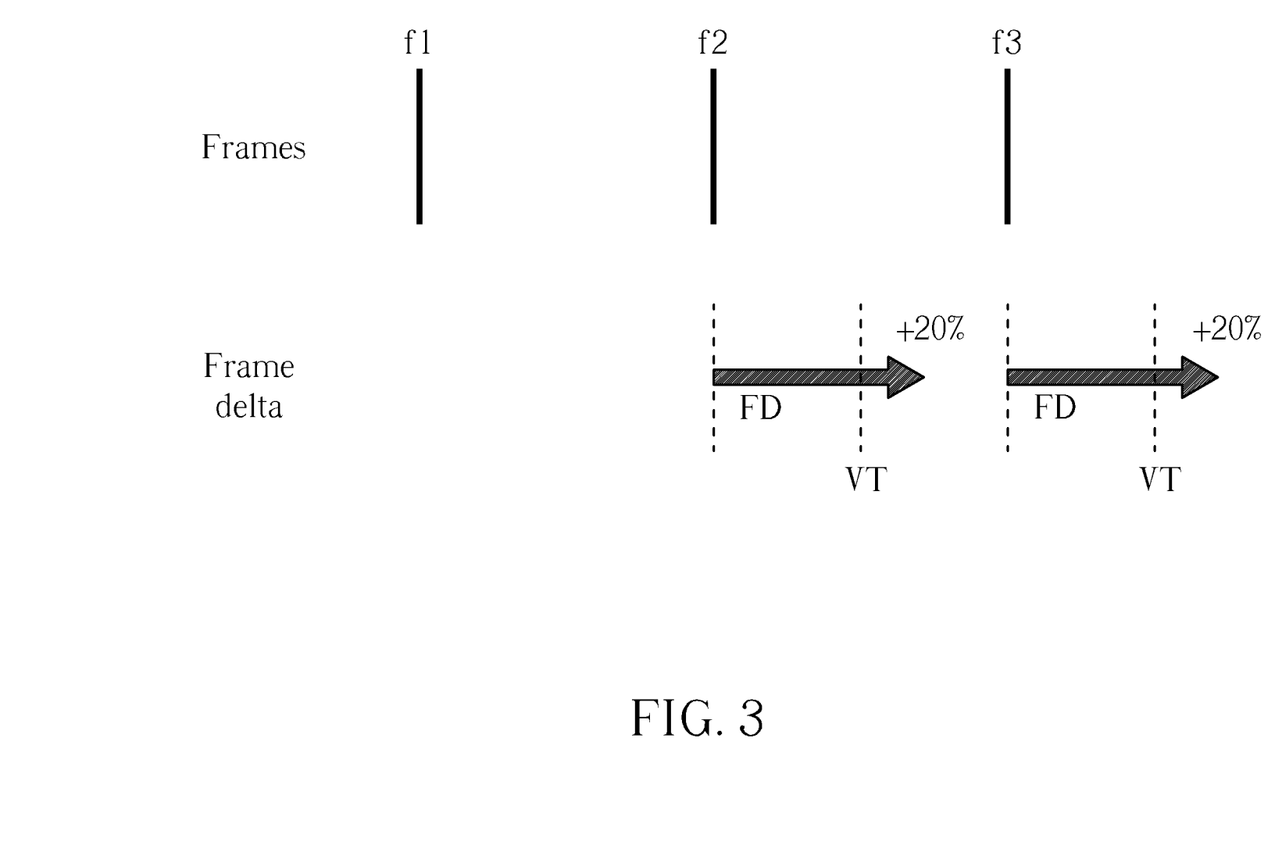

In the embodiment depicted in FIG. 3, the frame delta FD is larger than a predetermined threshold value VT, which means the offset is large, thus the offset needs to be adjusted if it is desired to maintain at a constant value. However, in the embodiment of FIG. 3, the frame rate is bounded by a maximum frame rate. Accordingly, the frame rate for the embodiment of FIG. 3 cannot be adjusted and the offset for the embodiment of FIG. 3 is directly increased.

Figure 4:
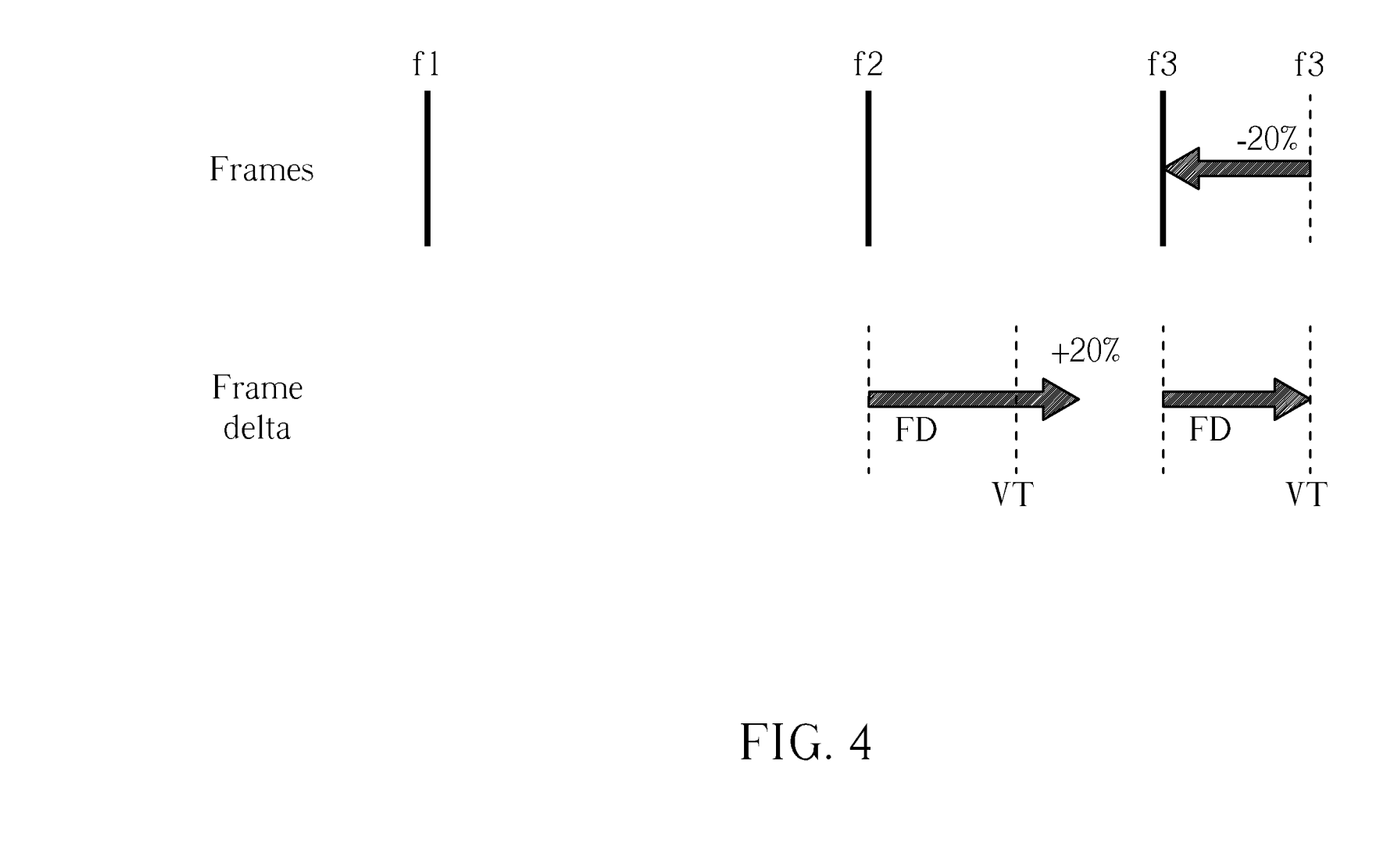

On the contrary, in the embodiment depicted in FIG. 4, the frame delta FD is larger than a predetermined threshold value VT and the frame rate is not bounded by a maximum frame rate. Accordingly, the frame rate is increased, that is, the frame period between the frame f2, f3 is decreased. By this way, the frame delta FD is reduced thus the offset is correspondingly reduced.

Please note, the above-mentioned embodiments can be applied to any image sensing device besides the optical mouse. Accordingly, the image processing method can be summarized as the steps depicted in FIG. 5, which comprises following steps:

Step 501

Figure 5:
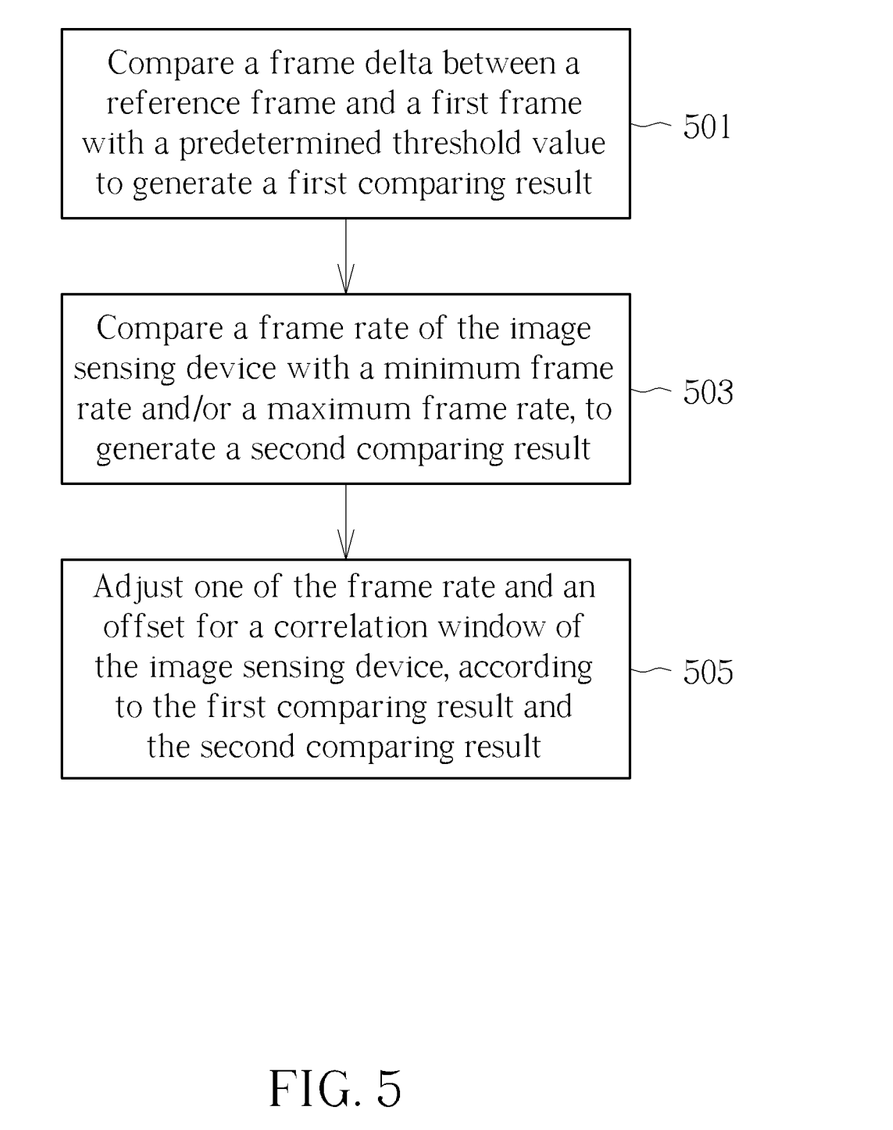
FIG. 5 is a flowchart illustrating steps of an image processing method according to an embodiment of the present application.

Compare a frame delta between a reference frame (ex. f1) and a first frame (ex. f2) with a predetermined threshold value (ex. VT) to generate a first comparing result.

Step 503

Compare a frame rate of the image sensing device with a minimum frame rate and/or a maximum frame rate, to generate a second comparing result.

Step 505

Adjust one of the frame rate and an offset for a correlation window of the image sensing device, according to the first comparing result and the second comparing result.

Other detail steps can be acquired based on above-mentioned embodiments, thus are omitted for brevity here. Also, in one embodiment, a non-transitory computer-readable medium, such as an optical disc or a hard disk is provided, which stores a program causing a computer to execute the above-mentioned image processing method. However, the above-mentioned image processing method is not limited to be performed via above-mentioned non-transitory computer-readable medium.

Figure 6:
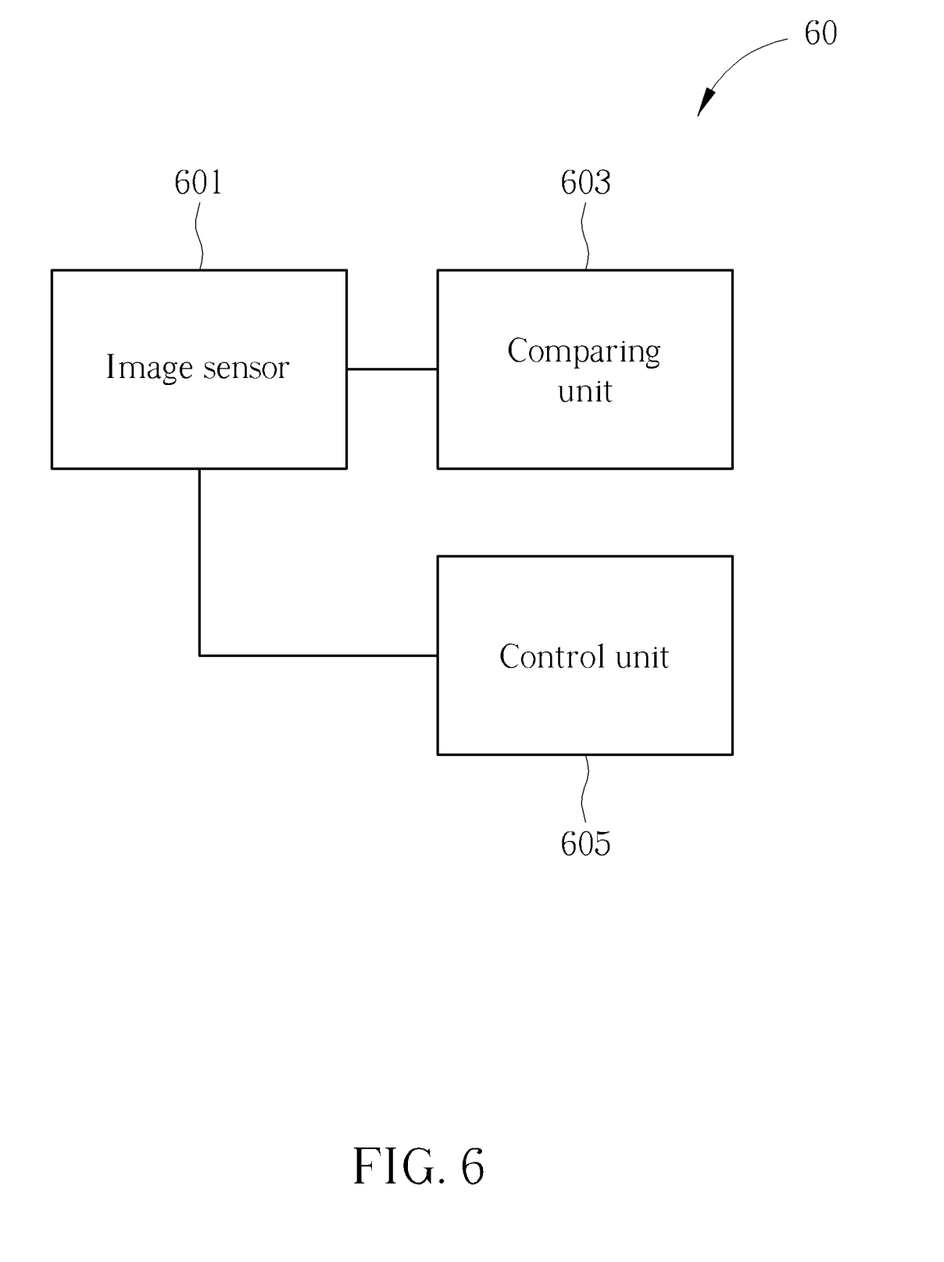
FIG. 6 is a block diagram illustrating an image sensing device according to one embodiment of the present application.

FIG. 6 is a block diagram illustrating an image sensing device according to one embodiment of the present application. As illustrated in FIG. 6, the image sensing device 600 comprises an image sensor 601, a comparing unit 603 and a control unit 605. The image sensor 601 is configured to capture a first frame (ex. f2 in FIG. 1-FIG. 4) and a reference frame (ex. f1 in FIG. 1-FIG. 4). The comparing unit 603 is configured to compare a frame delta between the reference frame and the first frame with a predetermined threshold value to generate a first comparing result. Also, the comparing unit 603 is configured to compare a frame rate of the image sensing device with a minimum frame rate and/or a maximum frame rate, to generate a second comparing result. The control unit 605 is configured to adjust one of the frame rate and an offset for a correlation window of the image sensor 601, according to the first comparing result and the second comparing result.

Other detail steps can be acquired based on above-mentioned embodiments, thus are omitted for brevity here. The above-mentioned devices can be implemented by hardware (ex. a circuit) or hardware with software (ex. a processing unit executing a specific software program). Accordingly, the devices illustrated in FIG. 6 can be combined or separated.

In view of above-mentioned embodiments, the offset for the correlation window can be maintained at a constant value, thus the prediction issue for the prior art can be solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A non-transitory computer-readable medium storing a program causing a computer to execute an image processing method applied to an image sensing device, the image processing method comprising:
   (a) comparing a frame delta between a reference frame and a first frame with a predetermined threshold value to generate a first comparing result;
   (b) comparing a frame rate of the image sensing device with a minimum frame rate to generate a first difference and comparing the frame rate with a maximum frame rate to generate a second difference; and
   (c) adjusting a frame rate of the image sensing device according to the first comparing result but not adjusting an offset for a correlation window of the image sensing device, if the first difference and the second difference are larger than a predetermined difference; and
   (d) adjusting the offset according to the first comparing result but not adjusting the frame rate, if the first difference and the second difference are smaller than or equal to the predetermined difference.

2. The non-transitory computer-readable medium of claim 1, wherein if the first comparing result indicates the frame delta is larger than or equals to the predetermined threshold value, the image processing method further comprises: setting the first frame as the reference frame.

3. The non-transitory computer-readable medium of claim 1, wherein if the first comparing result indicates the frame delta is smaller than the predetermined threshold value and the first difference is smaller than or equal to the predetermined difference, the step (d) decreases the offset.

4. The non-transitory computer-readable medium of claim 3, wherein the predetermined difference is 0.

5. The non-transitory computer-readable medium of claim 1, wherein if the first comparing result indicates the frame delta is larger than the predetermined threshold value and the second difference is larger than the predetermined difference, the step (c) increases the frame rate.

6. The non-transitory computer-readable medium of claim 5, wherein the predetermined difference is 0.

7. The non-transitory computer-readable medium of claim 1, wherein if the first comparing result indicates the frame delta is smaller than the predetermined threshold value and the first difference is larger than the predetermined difference, the step (c) decreases the frame rate.

8. The non-transitory computer-readable medium of claim 7, wherein the predetermined difference is 0.

9. The non-transitory computer-readable medium of claim 1, wherein if the first comparing result indicates the frame delta is larger than the predetermined threshold value and the second difference is smaller than or equals to the predetermined difference, the step (d) increases the offset.

10. The non-transitory computer-readable medium of claim 9, wherein the predetermined difference is 0.

11. The non-transitory computer-readable medium of claim 10, wherein the image sensing device is an optical navigating device.

12. An image sensing device, comprising:
   an image sensor, configured to capture a first frame and a reference frame;
   a comparing unit, configured to compare a frame delta between the reference frame and the first frame with a predetermined threshold value to generate a first comparing result,
configured to compare a frame rate of the image sensing device with a minimum frame rate to generate a first difference and to compare the frame rate with a maximum frame rate to generate a second difference; and
a control unit,
configured to adjust a frame rate of the image sensing device according to the first comparing result but not adjust an offset for a correlation window of the image sensing device, if the first difference and the second difference are larger than a predetermined difference;
configured to adjust the offset but not adjust the frame rate if the first difference and the second difference are smaller than or equal to the predetermined difference.

13. The image sensing device of claim 12, wherein if the first comparing result indicates the frame delta is larger than or equals to the predetermined threshold value, the control unit sets the first frame as the reference frame.

14. The image sensing device of claim 12, wherein if the first comparing result indicates the frame delta is smaller than the predetermined threshold value and the first difference is smaller than or equal to the predetermined difference, the control unit decreases the offset.

15. The image sensing device of claim 14, wherein the predetermined difference is 0.

16. The image sensing device of claim 12, wherein if the first comparing result indicates the frame delta is larger than the predetermined threshold value and the second difference is larger than the predetermined difference, the control unit increases the frame rate.

17. The image sensing device of claim 16, wherein the predetermined difference is 0.

18. The image sensing device of claim 12, wherein if the first comparing result indicates the frame delta is smaller than the predetermined threshold value and the first difference is larger than the predetermined difference, the control unit decreases the frame rate.

19. The image sensing device of claim 18, wherein the predetermined difference is 0.

20. The image sensing device of claim 12, wherein if the first comparing result indicates the frame delta is larger than the predetermined threshold value and the second difference is smaller than or equals to the predetermined difference, the control unit increases the offset.

21. The image sensing device of claim 20, wherein the predetermined difference is 0.

22. The image sensing device of claim 21, wherein the image sensing device is an optical navigating device.

23. The non-transitory computer-readable medium of claim 1, wherein the step (c) adjusts the frame rate to thereby adjust the offset to be a constant value, and the step (d) adjusts the offset to be the constant value.

24. The image sensing device of claim 12, wherein the control unit adjusts the frame rate to thereby adjust the offset to be a constant value if the first difference and the second difference are larger than a predetermined difference, and adjusts the offset to be the constant value if the first difference and the second difference are smaller than or equal to the predetermined difference.

* * * * *